US009621941B2

(12) United States Patent
Lemmey et al.

(10) Patent No.: US 9,621,941 B2
(45) Date of Patent: Apr. 11, 2017

(54) SYSTEMS AND METHODS FOR PROVIDING AN INTERACTIVE EXPERIENCE FOR PEOPLE IN A VEHICLE ENVIRONMENT

(71) Applicant: Wickr Inc., San Francisco, CA (US)

(72) Inventors: Tara Lemmey, San Francisco, CA (US); Stanislav Vonog, San Francisco, CA (US); Nikolay Surin, San Francisco, CA (US)

(73) Assignee: WICKR INC., San Francisco, CA (US)

( * ) Notice: Subject to any disclaimer, the term of this patent is extended or adjusted under 35 U.S.C. 154(b) by 0 days.

(21) Appl. No.: 15/138,399

(22) Filed: Apr. 26, 2016

(65) Prior Publication Data

US 2016/0241899 A1  Aug. 18, 2016

Related U.S. Application Data

(63) Continuation of application No. 13/856,434, filed on Apr. 3, 2013, now abandoned.

(51) Int. Cl.
*H04N 21/41* (2011.01)
*H04N 21/414* (2011.01)
*H04N 21/478* (2011.01)
*H04N 21/214* (2011.01)
*H04N 21/4788* (2011.01)

(52) U.S. Cl.
CPC ... *H04N 21/41422* (2013.01); *H04N 21/2146* (2013.01); *H04N 21/414* (2013.01); *H04N 21/478* (2013.01); *H04N 21/4788* (2013.01)

(58) Field of Classification Search
None
See application file for complete search history.

(56) References Cited

U.S. PATENT DOCUMENTS

| 2012/0060101 | A1* | 3/2012 | Vonog | H04N 21/4788 715/751 |
| 2014/0127999 | A1* | 5/2014 | Kane | H04W 4/008 455/41.2 |
| 2014/0128144 | A1* | 5/2014 | Bavitz | A63F 9/24 463/23 |
| 2014/0187219 | A1* | 7/2014 | Yang | H04W 4/046 455/418 |

* cited by examiner

*Primary Examiner* — Ricky Chin
(74) *Attorney, Agent, or Firm* — Perkins Coie LLP

(57) ABSTRACT

A system to provide an interactive experience with a participant device operating in relation to a vehicle is disclosed. The interactive experience may include live experience presentations synchronized across multiple participant devices. The multiple participant devices may be operating within or outside of the vehicle. The system may identify a relationship between the participant device and the vehicle. A live experience presentation on the participant device is configured based on the identified relationship. One or more of multimedia and/or multi-sensory streams may be communicated amongst the multiple participant devices and an experience service as layers. The layers are composed to generate the live experience presentation. The experience service may be implemented by an experience platform system.

27 Claims, 12 Drawing Sheets

SYSTEMS AND METHODS FOR PROVIDING AN INTERACTIVE EXPERIENCE FOR PEOPLE IN A VEHICLE ENVIRONMENT

CROSS-REFERENCE TO RELATED APPLICATIONS

This application is a Continuation of U.S. patent application Ser. No. 13/856,434, entitled "SYSTEMS AND METHODS FOR PROVIDING AN INTERACTIVE EXPERIENCE FOR PEOPLE IN A VEHICLE ENVIRONMENT, filed Apr. 3, 2013, the contents of which are hereby incorporated by reference in their entirety.

BACKGROUND

Field of Invention

Interactive events and gatherings allow people and/or audience to interact with each other and with event performers. Each interactive experience can be unique and fun. However, interactive events have been constrained to one physical location.

While live events or gatherings can be broadcasted through Internet or TV channels, interaction options are limited. Each participant of a live event can watch the same live video stream. Participants do not feel connected with other participants in remote physical venues nor the performer(s) or speaker(s) of the live event or gathering.

Disclosure of Invention

A method of operating a network-capable experience platform system is disclosed. The method includes: facilitating an interactive gathering by providing layers for composing a live experience presentation on a participant device, the layers including a content layer; identifying a relationship between the participant device and a vehicle; configuring the live experience presentation based on the relationship between the participant device and the vehicle; generating an interactive object within the layers based on the relationship; and managing the interactive object based on the relationship. The method may be implemented as one or more modules stored on a non-transitory storage medium executable by a processor.

A method of operating a network-capable participant device is also disclosed. The method includes: receiving a content layer at the participant device; generating a live experience presentation for an interactive gathering on the participant device, the live experience presentation composed of layers including a base layer and the content layer; identifying a relationship between the participant device and a vehicle; configuring the live experience presentation based on the relationship; generating an interactive object within the layers based on the relationship; and managing the interactive object based on the relationship.

An in-vehicle device coupled to a vehicle is further disclosed. The in-vehicle device is configured to join or create an interactive gathering and interact with a participant device through a together experience service. The in-vehicle device includes: a network device configured to communicate with the together experience service and receive multimedia stream layers from the together experience service; a sensor configured to provide a location information of the vehicle; a input device configured to capture a multimedia stream; and a module stored on a non-transitory storage medium, when executed by a processor is configured to: receive a video stream from the participant device external to the vehicle via the network device; generate a live experience presentation of the interactive gathering, the live experience presentation composed of the multimedia stream layers including a content layer and the video stream; provide an interactive object on the live experience presentation capable of affecting external live experience presentation of the participant device to facilitate interaction among participants of the interactive gathering.

BRIEF DESCRIPTION OF DRAWINGS

These and other objects, features, and characteristics of the present disclosure will become more apparent to those skilled in the art from a study of the following detailed description in conjunction with the appended claims and drawings, all of which form a part of this specification. In the drawings:

Figure 1:
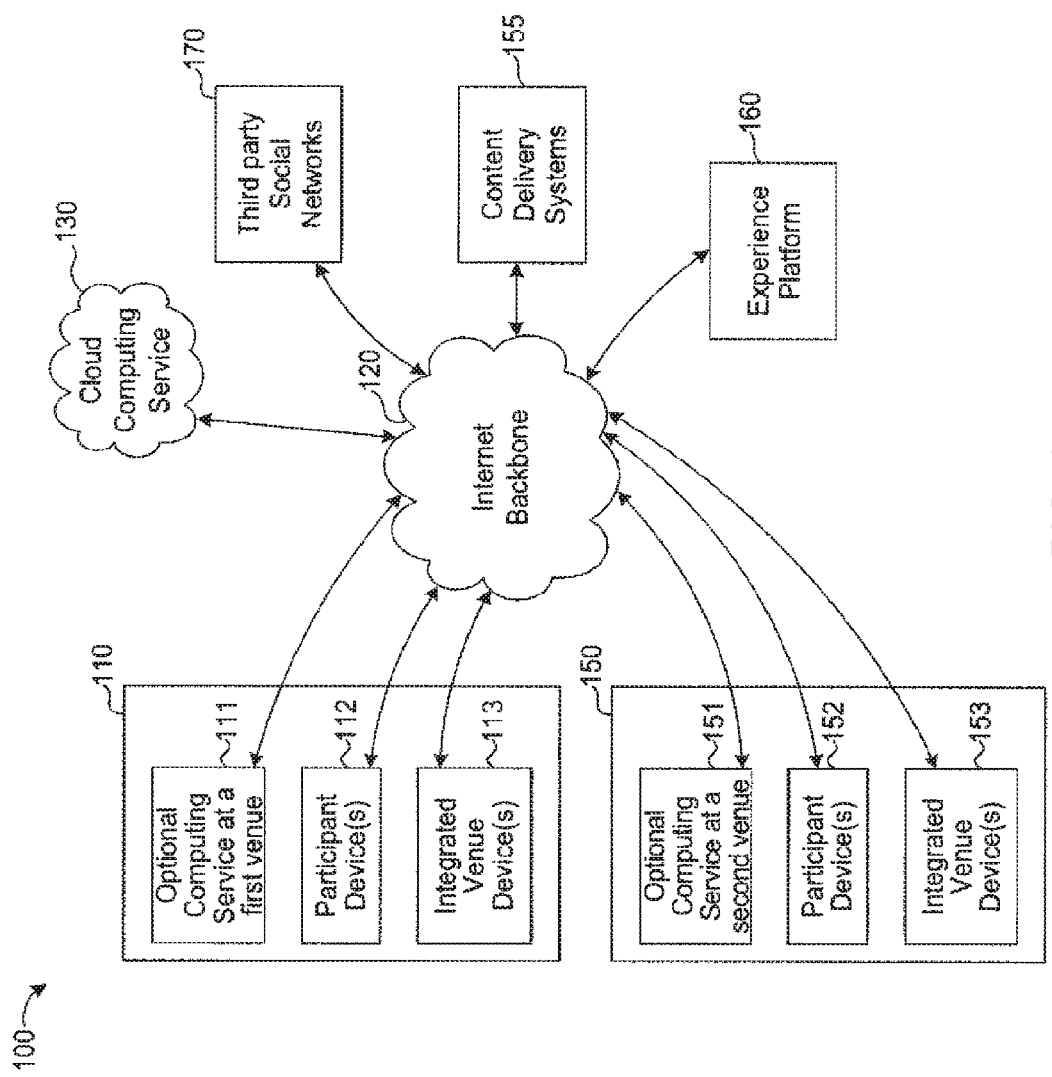
FIG. 1 illustrates an interactive experience system in accordance with one embodiment of the present disclosure.

The drawings have not necessarily been drawn to scale. For example, the dimensions of some of the elements in the figures may be expanded or reduced to help improve the understanding of the embodiments of the present disclosure. Similarly, some components and/or operations may be separated into different blocks or combined into a single block for the purposes of discussion of some of the embodiments of the present disclosure. Moreover, while the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Various embodiments of the present disclosure generally relate to methods and systems for providing an interactive experience capable of synchronizing participants at one or more physical venues. In some embodiments, the one or more physical venues may include mobile vehicles, stationary locations, or any combination thereof. Vehicles may include, but are not limited to, aircraft, trains, boats, buses, automobiles, emergency vehicles, or any combination thereof. In such vehicles, participants may include, but are not limited to, drivers, pilots, support staff such as an airline flight crew, passengers, or any combination thereof. Stationary locations may include, but are not limited to, buildings, stadiums, houses, parks, plazas, other locations that are not mobile, or any combination thereof.

Traditionally, participants in vehicles had limited options to interact with other participants in their vehicle, with participants in other vehicles, or with participants at other remote stationary physical venues. For example, some airlines provide passengers with an option to chat via an instant message service with fellow passengers on a flight. In such an example, passengers may communicate but do not feel connected. Although in close proximity to each other, passengers may feel disconnected from each other due to the way in which they are seated. In contrast, various embodiments of the present disclosure provide multiple participants an interactive experience through the use of multiple devices, multiple sensors and/or an experience platform. The interactive experience may be presented to participants in the form of audio, visual, tactile, or other sensations. Streams of data from one or more physical venues or at other physical venues may be coupled and synchronized through an experience platform. The content (e.g. audio and/or visual streams) of the interactive experience may then be shared among participants at any number of physical venues. Any particular participant at a particular physical venue can play an active role in the interactive experience by interacting with other participants at the particular physical venue or with other participants at other physical venues.

While examples described herein refer to an interactive experience system, the descriptions should not be taken as limiting the scope of the present disclosure. Various alternative, modifications and equivalents will be apparent to those skilled in the art without varying from the spirit of the invention. For example, coupling and synchronizing an interactive event experience may be implemented in any computing system organizing live data stream. For another example, the interactive event experience system may include multiple computer systems spanning multiple locations, or reside in a cloud computing platform. It will be appreciated by one of ordinary skill in the art that computing devices constituting the cloud computing platform need not be located remotely from a particular physical venue. For example, multiple participant devices, such as iPad® devices, iPhone® devices, Android® devices, other tablet devices, or any combination thereof may be located at or near a particular physical venue and may be coupled to each other through a wired (e.g. USB, or Ethernet over twisted pairs of copper cable such as Category 6 cable) or wireless (e.g. Wifi, or Bluetooth) connection, thereby constituting a cloud computing platform.

FIG. 1 diagrams an interactive experience system 100 suitable for providing an interactive event experience. The system may include an experience platform 160, a local physical venue 110 and one or more remote physical venues 150. Examples of the local physical venue 110 or remote physical venues 150 may in include, vehicles, stationary locations, or any combination thereof. The local physical venue 110 may include one or more participant devices 112, such as iPad® devices, iPhone® devices, Android® devices, other tablet devices, or any combination thereof, one or more integrated venue devices 113, such as speakers, LCD monitors, sensors (e.g. cameras, microphones, heat sensors, proximity sensors), or any combination thereof, an optional computing service 111, and an internet connection coupling the one or more participant devices to a cloud computing service 130. It is appreciated that the experience platform 160 need not be physically separate from the participant devices 112, 153, integrated venue devices 113, 153, optional computing service 111, 151, or cloud computing platform 130 as shown diagrammatically in FIG. 1. See FIG. 2 for further information on the experience platform 160. Each of the one or more remote venues 150 may include one or more participant devices 152, one or more integrated venue devices 153, an optional computing service 151, and an internet connection coupling at least one participant device to the cloud computing platform 130. The experience platform 160 can couple audiovisual streams from the host physical venue 110 and the one or more remote physical venues 150, and provide a synchronized interactive event experience to all participants.

The interactive experience system 100 can provide options to a host participant to create an interactive experience spanning across a plurality of physical venues. The host participant may define the interactive experience as a public experience or a private experience. The host participant at the host physical venue may invite participants at the host physical venue, participants at remote physical venues, and/or participants online, to join the interactive experience. If the interactive experience is private, only the host participant and/or invited participants can invite additional participants to join the interactive experience.

In some embodiments, the interactive experience may include at least a content layer with audio and visual dimensions. The content layer may include live audiovisual streams (e.g. video, still images, and/or rendered graphics) from a plurality of physical venues, recorded audiovisual streams (e.g. video, still images, and/or rendered graphics), streams of data associated with interactive games, streams of data associated with text, streams of data associated with other media (e.g. software, or documents), or any combination thereof. Based on the characteristics of a particular physical venue, the content layer of the interactive experience may be presented differently on different integrated venue devices and participant devices.

Some embodiments may present a plurality of objects (e.g. graphical tiles displaying video streams presented on an LCD screen, graphical tiles displaying digital still images presented on an LCD screen, graphical tiles displaying graphics associated with an interactive game presented on an LCD screen, audio streams presented through a speaker, or any combination thereof) on an integrated venue device and/or participant device at a physical venue. Each object may correspond to live audiovisual streams from a particular physical venue or from remote physical venues. In some implementations, the volume of the audio stream from a particular participant device and/or a particular integrated venue device may be a function of the proximity between the particular participant device and/or the particular integrated venue device and another participant device and/or another integrated venue device. In some implementations, the audio stream from a particular participant device and/or particular integrated venue device may be set at a constant ambient level or muted if the distances (as displayed on a participant device and/or integrated venue device) between the objects corresponding to the audio stream from the particular participant device and/or the particular integrated venue device are beyond a certain distance from the objects corresponding to another participant device and/or integrated venue device.

The interactive experience system 100 can provide options to a particular participant at a particular physical venue to select and engage in dialogue with another participant at either the particular physical venue or at a particular remote physical venue. During the dialogue, the objects corresponding to video and audio streams from the particular participant and/or the particular remote physical venue may become larger, as in the size of a particular object, and/or more prominent audio in the interactive event. In some embodiments, close-up video of the particular participant and/or the other participant may be provided while the particular participant and/or the other participant are talking.

In some embodiments, when the particular participant and/or the other participant start to talk, the volume of audio streams from other dimensions may go down. When the particular participant and/or the other participant stop talking, the volume of audio streams from other dimensions may go up again. In some implementations, video(s) that is shared among all participants in the content layer may be replaced with video and audio streams from the particular participant and/or the other participant who are talking.

In some embodiments, participants may have different predetermined roles within the interactive experience. The content presented and/or options available to each participant may depend on the pre-determined role of the participant.

For example, in the case of an interactive experience on an aircraft, the participants may assume a number of different roles including, but not limited to, pilot, passenger, or aircraft support staff. Due to safety concerns, a pilot may not have access to entertainment content, such as video, that is available to the passengers, but may have broad control over the way in which the content is presented to passengers. For example, the pilot may, through the use of the interactive experience system 100, present visual or audio content associated with flight announcements on integrated venue devices and/or passenger participant devices, or may draw on a live map displayed on integrated venue device and/or passenger participant devices to relay information about a diverted flight path. In order to provide the pilot greater control over the interactive experience, the interactive experience system 100 may provide the pilot with the option to override all content currently displayed on passenger participant devices. Similarly, the interactive experience system 100 may provide the aircraft support staff with options to override a particular interactive experience among passenger participants make an important announcements to passenger participants regarding the flight. Conversely, passenger participants may have only limited control over content displayed on other participant devices. For example, the interactive experience system 100 may allow a family of passenger participants that are not seated together to share photos among passenger participant devices associated with the family of passenger participants, but may not allow the passenger participants to share photos with the integrated venue devices.

In some embodiments, the content and/or options presented on a participant device may be determined by the relative position of the device within a physical venue.

For example, in the case of an automobile as a physical venue, the interactive experience system 100 may restrict certain content associated with the interactive experience from being presented on a participant device located near the driver's seat in order to prevent the distraction of a driver participant. In the same example, the interactive experience system 100 may provide the participant device different options to adjust the content of the interactive experience depending on the location of the participant device in the automobile. For example, options to control the ambient temperature in the automobile may be presented on a participant device located near the front passenger seat, but not on participant devices located near the rear passenger seats. Similarly, in the case of an aircraft as a physical venue, the interactive experience system 100 may restrict certain content associated with the interactive experience from being presented on a participant device located in the cockpit in order to prevent the distraction of a pilot and/or co-pilot. In that same example, access to services associated with the interactive experience may differ depending on the class of seating in which a participant device is located. Participant devices located in a first class seating section may be allowed the option of viewing entertainment content not available to participant devices located in the coach seating area.

The interactive experience system 100 may equalize participant devices and/or integrated venue devices at a plurality of physical venues through an experience platform 160. The experience platform 160 can couple and synchronize audiovisual streams from the plurality of physical venues, resulting in a synchronized interactive experience between participants at each physical venue. Audio and/or visual streams from participant devices and/or integrated venue devices at a local physical venue 110 and/or remote physical venue 150 may be transmitted to the experience platform 160 via internet. The experience platform 160 can couple and synchronize the audio and/or visual streams from the local physical venue 110 and/or remote physical venue 150. Audio and/or visual streams from a particular physical venue can be presented as one or more objects on one or more content layers provided by the experience platform 160, each of the one or more objects corresponding to audio and/or visual streams from a particular physical venue.

In some embodiments, the experience platform may take a set of audio streams from a particular physical venue at any particular time. The set of audio streams from the particular physical venue can be generated by a microphone, one of the participant device(s), or combined audio streams from the microphone and the participant device. The combined audio streams can be provided by an audiovisual system coupled to the microphone and the smart device at the particular physical venue via a Wi-Fi or a wired connection.

In some embodiments, options are provided to a particular participant and/or particular physical venue to manage attention in the interactive experience. The particular participant may draw and/or write on the content layer with a variety of color selections. The color ink of drawing or writing can be color-coded with each color representing a specific meaning. For example, an aircraft flight crew participant can display an image of the aircraft on passenger participant devices and then circle the exits of the aircraft in green to indicate points of egress. Similarly, the aircraft flight crew participant may circle a section of the aircraft in red to indicate an area of the aircraft that is not accessible to passengers.

In some embodiments, participants can be organized into groups. For example, passenger participants on an aircraft may be divided into two teams to play an interactive game through the interactive experience system 100. Similarly, passenger participants on a flight may compete as a team in an interactive game against passengers on another flight through the interactive experience system 100.

In some implementations, a particular participant using a particular participant device may initiate an interaction with other participants by throwing animated objects, such as flowers, eggs, tomatoes, or other animated objects at the screens of other participant devices. In this example, the participant throwing the animated objects may do so by making a hand gesture that is sensed by the particular participant device. In some implementations, a particular participant at a physical venue can participate in the interactive experience through gestures and/or actions, e.g., clapping, cheering, jeering, and booing. In this example, the gestures and/or actions may be sensed by sensors inside participant devices and/or integrated venue devices.

Some embodiments may provide methods instantiated on an experience platform, a local computer and/or a portable device. In some implementations, methods may be distributed across local and remote devices in the cloud computing service.

Figure 2:
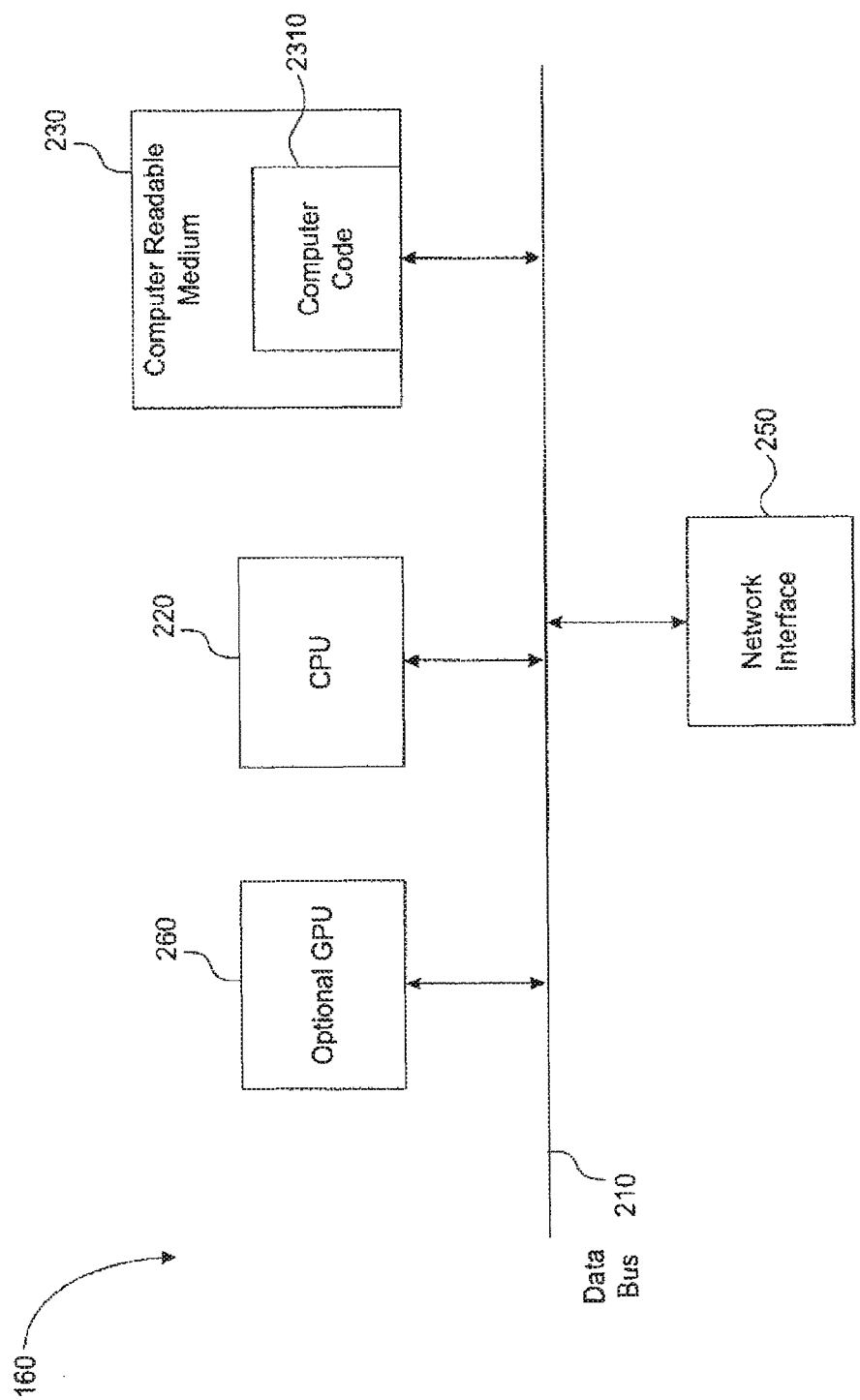
FIG. 2 illustrates a schematic block diagram of a cloud-based experience platform 160 according to another embodiment of the present disclosure.

FIG. 2 illustrates a schematic block diagram of a cloud-based experience platform 160 according to another embodiment of the present disclosure. The experience platform 160 may include at least one processor 220, one or more network interface 250 and one or more computer readable medium 230, all interconnected via one or more data bus 210. In FIG. 2, various components are omitted for illustrative simplicity. The experience platform 160 is intended to illustrate a device on which any other components described in this specification (e.g., any of the components depicted in FIGS. 1-12) can be implemented.

The experience platform 160 may take a variety of physical forms. By way of examples, the experience platform 160 may be a desktop computer, a laptop computer, a personal digital assistant (PDA), a portable computer, a tablet PC, a wearable computer, an interactive kiosk, a mobile phone, a server, a mainframe computer, a mesh-connected computer, a single-board computer (SBC) (e.g., a BeagleBoard, a PC-on-a-stick, a Cubieboard, a CuBox, a Gooseberry, a Hawkboard, a Mbed, a OmapZoom, a Origenboard, a Pandaboard, a Pandora, a Rascal, a Raspberry Pi, a SheevaPlug, a Trim-Slice), an embedded computer system, or a combination of two or more of these. Where appropriate, the experience platform 160 may include one or more experience platform 160, be unitary or distributed, span multiple locations, span multiple machines, or reside in a cloud, which may include one or more cloud components in one or more networks. Where appropriate, one or more experience platform 160 may perform without substantial spatial or temporal limitation one or more steps of one or more methods described or illustrated herein. As an example and not by way of limitation, one or more experience platform 160 may perform in real time or in batch mode one or more steps of one or more methods described or illustrated herein. One or more experience platform 160 may perform at different times or at different locations one or more steps of one or more methods described or illustrated herein, where appropriate.

The experience platform 160 preferably may include an operating system such as, but not limited to, Windows®, Linux® or UNIX®. The operating system may include a file management system, which organizes and keeps track of files. In some embodiments, a separate file management system may be provided. The separate file management can interact smoothly with the operating system and provide enhanced and/or more features, such as improved backup procedures and/or stricter file protection.

The at least one processor 220 may be any suitable processor. The type of the at least one processor 220 may comprise one or more from a group comprising a central processing unit (CPU), a microprocessor, a graphics processing unit (GPU), a physics processing unit (PPU), a digital signal processor, a network processor, a front end processor, a data processor, a word processor and an audio processor.

The one or more data bus 210 is configured to couple components of the experience platform 160 to each other. As an example and not by way of limitation, the one or more data bus 210 may include a graphics bus (e.g., an Accelerated Graphics Port (AGP)), an Enhanced Industry Standard Architecture (EISA) bus, a front-side bus (FSB), a HyperTransport (HT) interconnect, an Industry Standard Architecture (ISA) bus, an Infiniband interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Although the present disclosure describes and illustrates a particular bus, this disclosure contemplates any suitable bus or interconnects.

The one or more network interface 250 may include one or more of a modem or network interface. It will be appreciated that a modem or network interface can be considered to be part of the experience platform 160. The interface can include an analog modem, an asymmetric digital subscribe line (ADSL) modem, a cable modem, a doubleway satellite modem, a power line modem, a token ring interface, a Cambridge ring interface, a satellite transmission interface or any suitable interface for coupling a computer system to other computer systems. The interface can include one or more input and/or output devices. The I/O devices can include, by way of example but not limitation, a keyboard, a mouse or other pointing device, disk drives, printers, a scanner, a touch screen, a tablet screen, and other input and/or output devices, including a display device. The display device can include, by way of example but not limitation, a cathode ray tube (CRT) display, a liquid crystal display (LCD), a 3-D display, or some other applicable known or convenient display device. For simplicity, it is assumed that controllers of any devices not depicted in the example of FIG. 2 reside in the interface.

The computer readable medium 230 may include any medium device that is accessible by the processor 220. As an example and not by way of limitation, the computer readable medium 230 may include volatile memory (e.g., a random access memory (RAM), a dynamic RAM (DRAM), and/or a static RAM (SRAM)) and non-volatile memory (i.e., a flash memory, a read-only memory (ROM), a programmable ROM (PROM), an erasable programmable ROM (EPROM), and/or an electrically erasable programmable ROM (EEPROM)). When appropriate, the volatile memory and/or non-volatile memory may be single-ported or multiple-ported memory. This disclosure contemplates any suitable memory. In some embodiments, the computer readable medium 230 may include a semiconductor-based or other integrated circuit (IC) (e.g., a field-programmable gate array (FPGA) or an application-specific IC (ASIC)), a hard disk, an HDD, a hybrid hard drive (HHD), an optical disc (i.e., a CD-ROM, or a digital versatile disk (DVD)), an optical disc drive (ODD), a magneto-optical disc, a magneto-optical drive, a floppy disk, a floppy disk drive (FDD), a magnetic tape, a holographic storage medium, a solid-state drive (SSD), a secure digital (SD) card, a SD drive, or another suitable computer-readable storage medium or a combination of two or more of these, where appropriate. The computer readable medium 230 may be volatile, non-volatile, or a combination of volatile and non-volatile, where appropriate.

Programs 2310 may be stored on the one or more computer readable medium 230. As an example, but not by way of limitation, the experience platform 160 may load the programs 2310 to an appropriate location on the one or more compute readable medium 230 for execution. The programs 2310, when executed, may cause the experience platform 160 to perform one or more operations or one or more methods described or illustrated herein. In some implementations, the operations may include, but are not limited to, receiving live stream signals, including audio streams, from each of a plurality of physical venues of an interactive event, synchronizing the live stream signals from the plurality of physical venues, displaying a plurality of objects on a content layer that is instantiated on the display device of each of the plurality of physical venues, each of the plurality of objects corresponding to live stream signals from a specific physical venue, and providing options for a specific participant at a particular physical venue to manage the size of each of plurality of objects on the display device at the particular physical venue.

As will be appreciated by one of ordinary skill in the art, the operations may be instantiated locally (i.e. on a local computer or a portable device) and may be distributed across a system including a portable device and one or more other computing devices. For example, it may be determined that the available computing power of the portable device is insufficient or that additional computer power is needed, and may offload certain aspects of the operations to the cloud. As discussed earlier, it will be appreciated to one having ordinary skill in the art that the cloud need not be located remotely from a particular physical venue. Instead, the cloud may comprise computing devices, including participant devices, located partially or exclusively at a particular physical venue.

Figure 3:
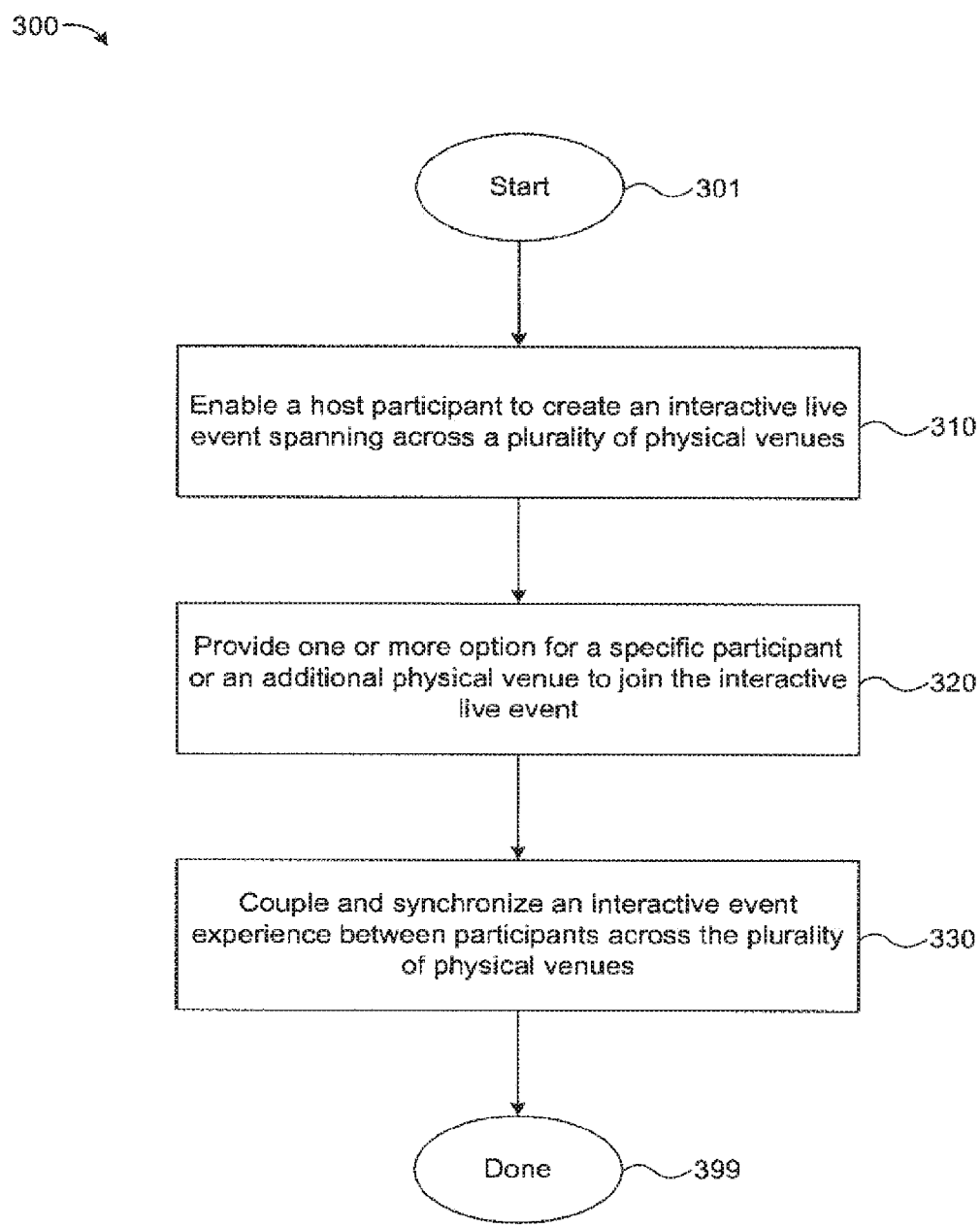
FIG. 3 illustrates a flow chart showing a set of operations 300 that may be used in accordance with yet another embodiment of the present disclosure.

FIG. 3 illustrates a flow chart showing a set of operations 300 that may be used in accordance with yet another embodiment of the present disclosure. At step 310, a host participant is provided option to create an interactive experience spanning across one or more physical venues. The interactive experience may have various dimensions, such as a content layer with live audiovisual dimensions and/or a content layer with interactive, graphic, and/or ensemble dimensions. The content layer may include audiovisual streams from a plurality of physical venues associated with the interactive experience and/or audiovisual streams between participants at a particular physical venue associated with the interactive experience.

At step 320, one or more options may be provided for a remote participant to join the interactive experience. A participant may opt to join an ongoing interactive experience if the interactive experience is public. If the interactive experience is private, only the host participant and/or existing participants of the interactive experience may invite new participants. At step 330, an interactive experience may be coupled and synchronized among participants across one or more physical venues.

Figure 4:
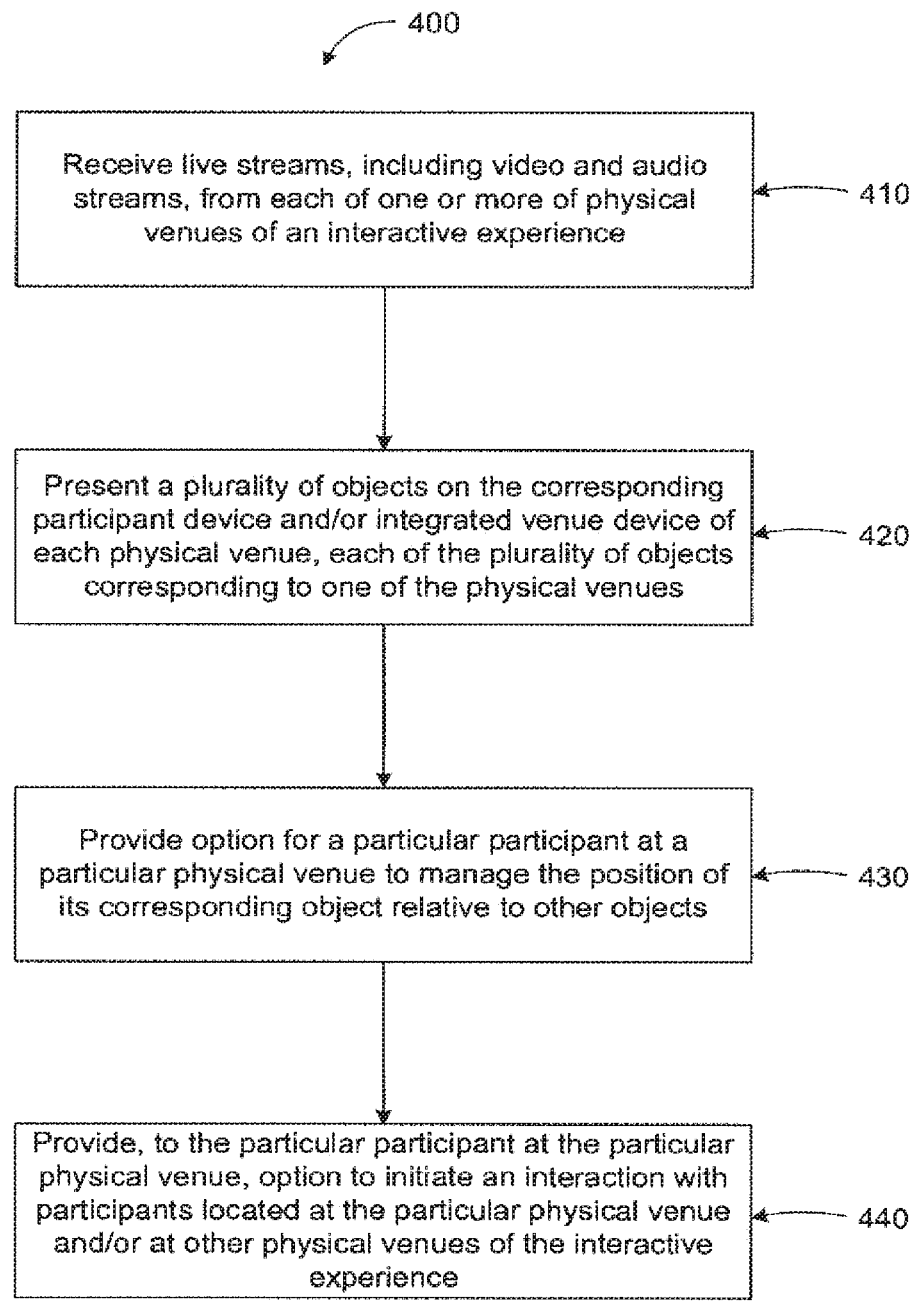
FIG. 4 illustrates a flow chart showing a set of operations that may be used in accordance with yet another embodiment of the present disclosure.

FIG. 4 illustrates a flow chart showing a set of operations 400 that may be used in accordance with yet another embodiment of the present disclosure. At step 410, live streams, including audio and visual streams, may be received from each of one or more physical venues of an interactive experience. The live streams may include close-up video of an individual participant (e.g., a host participant, a particular participant who is talking) and/or a group of participants (e.g., participants at a remote physical venue).

At step 420, a plurality of objects may be presented on the corresponding participant devices and/or integrated venue devices of each physical venue. Each of the plurality of objects may correspond to a particular physical venue of the interactive experience. In some implementations, a wide master shot capturing the overall live event at the host venue may be displayed as a content layer on the participant devices and/or integrated venue devices of each physical venue.

At step 430, options may be provided to a particular participant at a particular physical venue to manage the position of its corresponding object relative to other objects. The volume of a live audio stream from another physical venue may be a function of distance between the object corresponding to the particular physical venue and the objects corresponding to the other physical venue. The particular participant may move to a different relative position within the particular physical venue to experience different dimensions of the interactive experience.

At step 440, options may be provided to the particular participant at the particular physical venue to initiate an interaction with participants located at the particular physical venue or other physical venues of the interactive experience.

Figure 5:
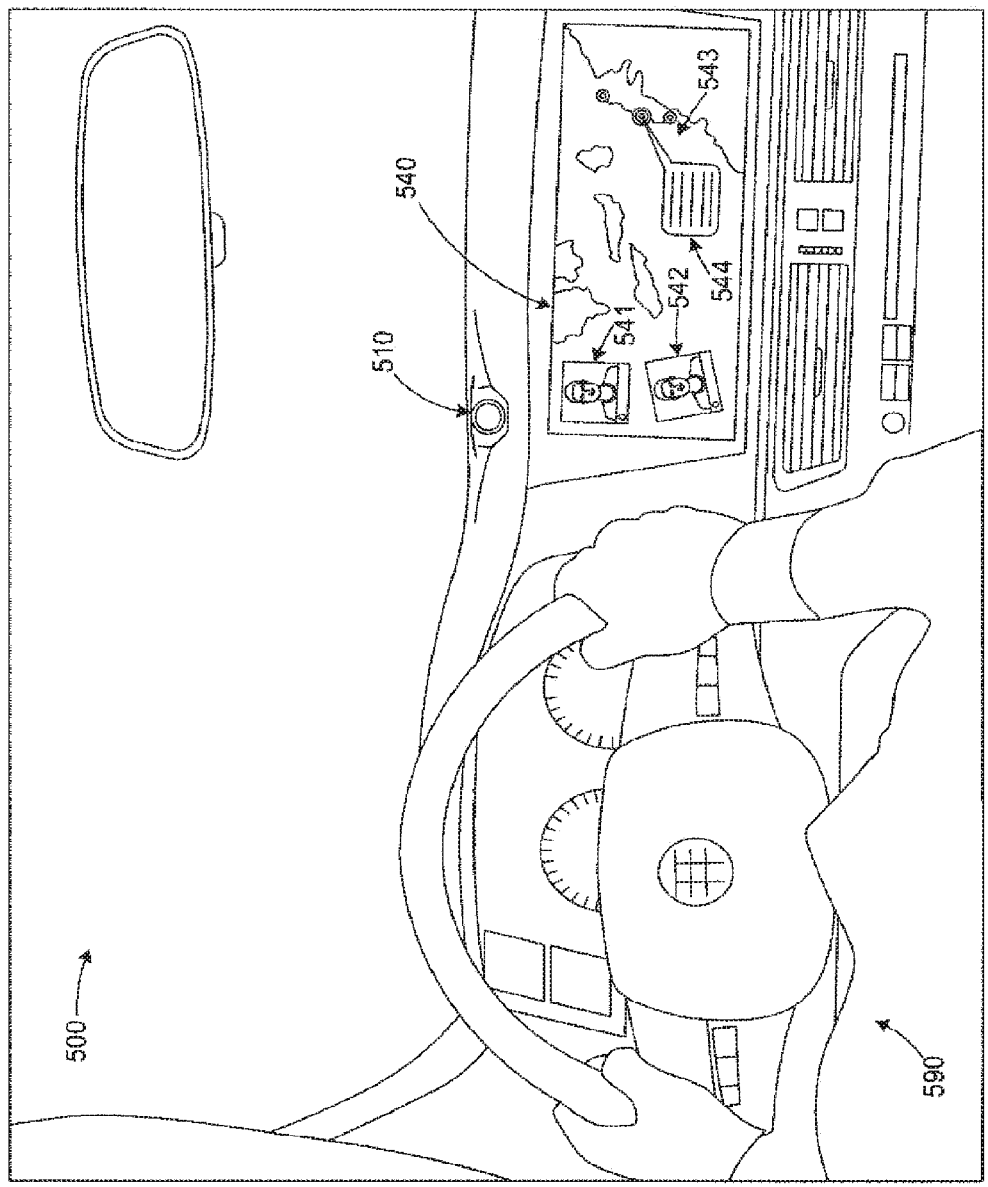
FIG. 5 illustrates a an interior view of an automobile implementing an interactive experience system in accordance with yet another embodiment of the present disclosure.
Figure 6:
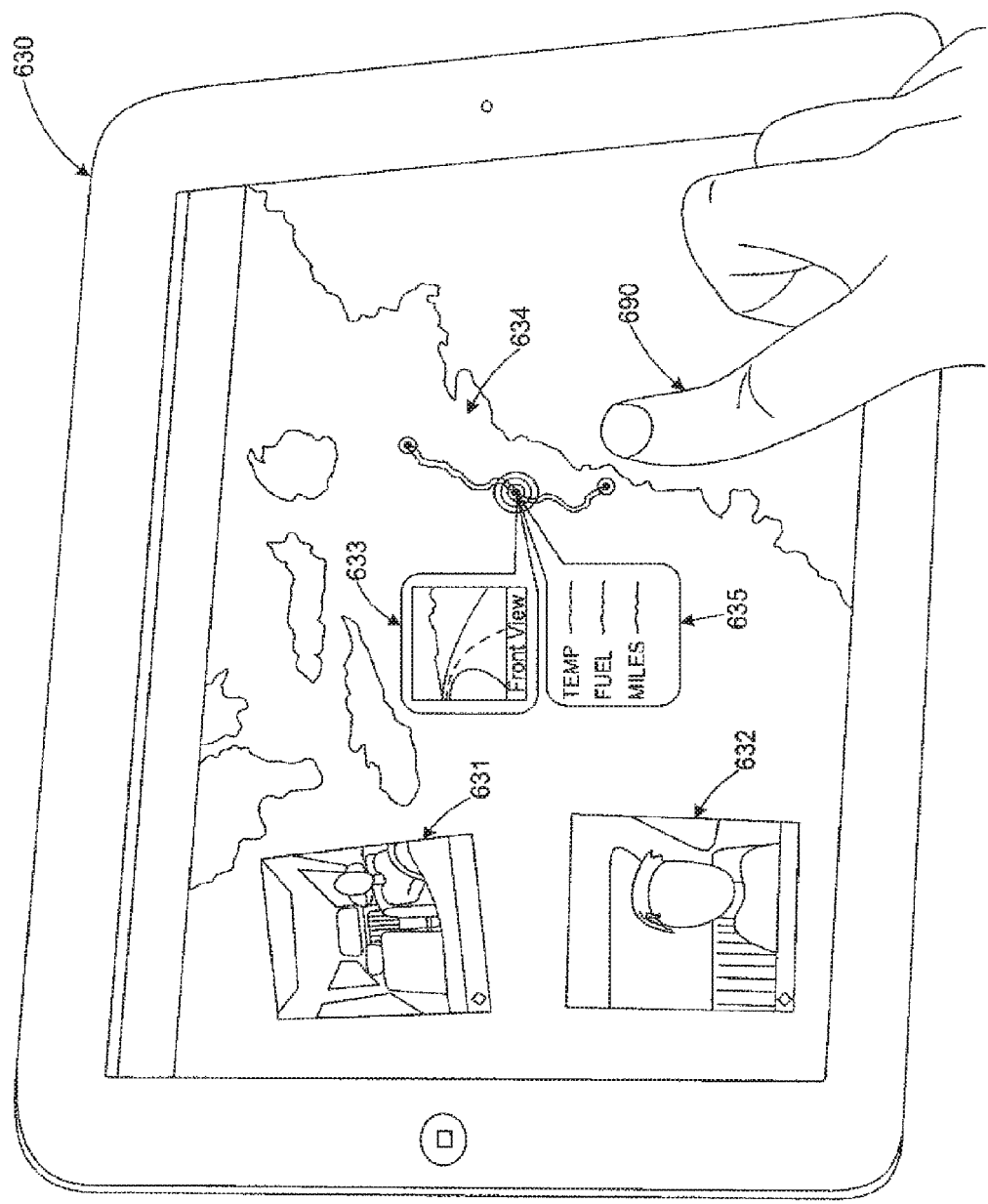
FIG. 6 illustrates devices in an automobile implementing an interactive experience system in accordance with yet another embodiment of the present disclosure.
Figure 7:
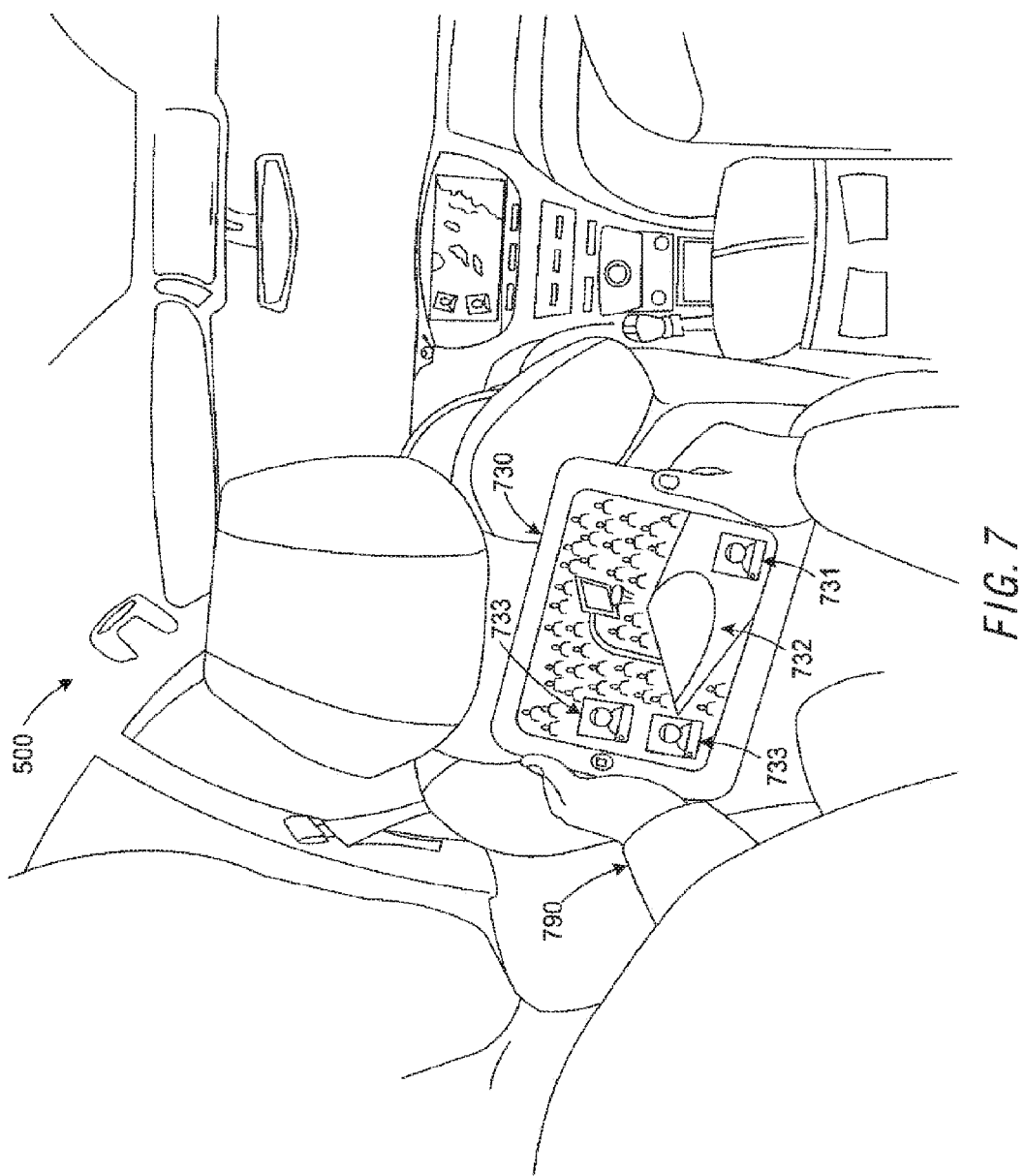
FIG. 7 illustrates devices in an automobile implementing an interactive experience system in accordance with yet another embodiment of the present disclosure.
Figure 8:
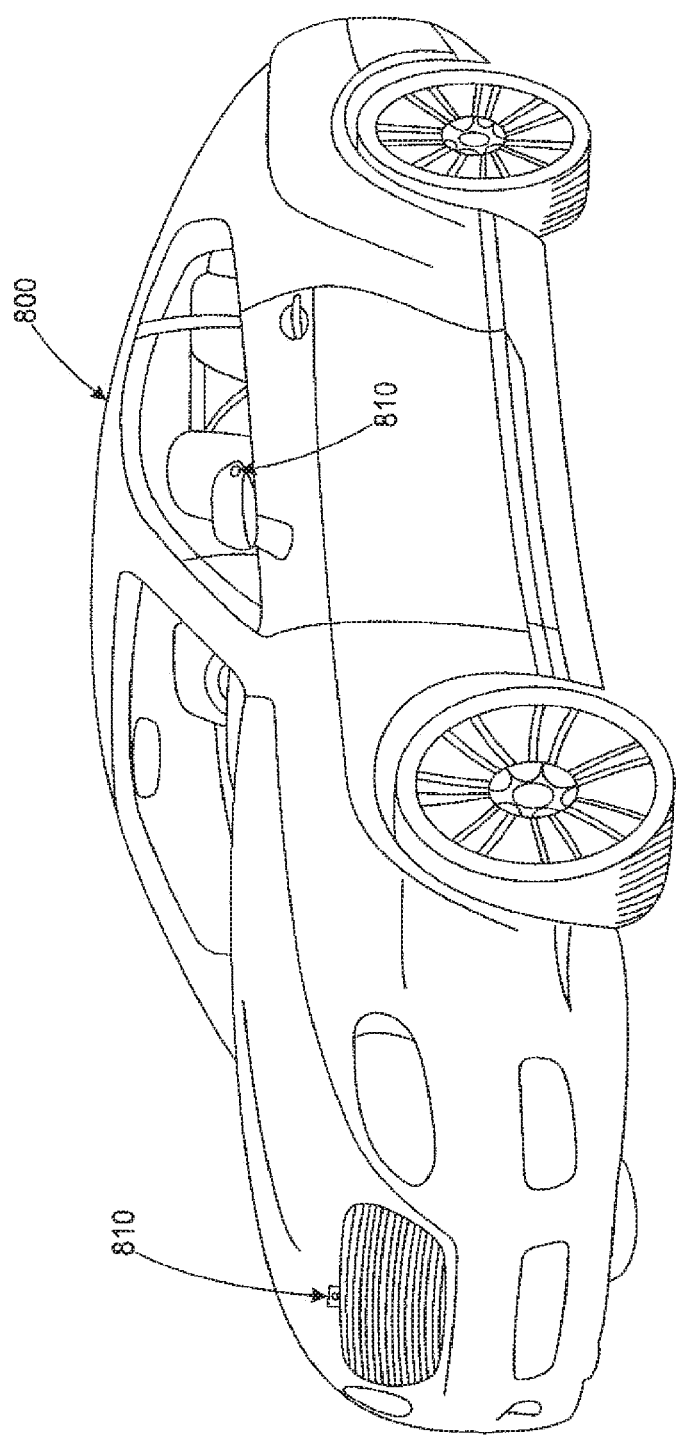
FIG. 8 illustrates an exterior view of an automobile implementing an interactive experience system in accordance with yet another embodiment of the present disclosure.

FIGS. 5-8 illustrate, by way of example, an implementation of the methods and systems in accordance with one embodiment of the present disclosure. In this example, a driver has initiated a private interactive experience at an automobile. FIG. 5 illustrates a driver's view inside an automobile that implements an interactive experience system. FIG. 6 illustrates a remote participant device that is interacting with the automobile illustrated in FIG. 5. FIG. 7 illustrates a passenger participant using a passenger participant device in the back seat of the automobile illustrated in FIG. 5. FIG. 8 illustrates an exterior view showing external sensors on the automobile illustrated in FIG. 5.

According to FIG. 8, the automobile may include external sensors such as cameras, heat sensors, proximity sensors, microphones, or any combination thereof. The external sensors may be functionally connected to a computing device located in the automobile via either a wired or wireless connection. The external sensors may also be functionally connected to a participant device located within the automobile or outside of the automobile via a wired or wireless connection. According to FIG. 5, the automobile may also have internal sensors such as cameras, proximity sensors, or microphones. Also according to FIG. 5, the automobile may have an integrated display and integrated speakers.

According to FIG. 5, an experience platform presents content associated with the interactive experience on one or more objects on one or more content layers. In the illustrated example, objects associated with visual streams may be displayed on the integrated display device inside the automobile. Similarly, objects associated with audio streams may be presented via integrated speakers inside the automobile. In the illustrated example, the objects presented are associated with an audiovisual stream from a remote participant device, an audiovisual stream from a participant device located near the back seat of the automobile, a graphic of a map showing the current location of the automobile, and a object graphically displaying updated data from the external and internal sensors of the automobile.

According to FIG. 6, a remote participant may have remote participant device capable of presenting content from the interactive experience. For the purpose of illuminating the present example, the remote participant in this example might be the spouse of the driver who has joined the driver's interactive experience from the couple's home. It should be noted that because the driver initiated a private interactive experience, the remote participant would wait for an invitation from the driver or from an existing participant before joining the interactive experience. The experience platform couples and synchronizes the data associated with the events occurring at the automobile which allows the remote participant to participate in the interactive experience. In the illustrated example, the objects of the interactive experience presented on the remote participant device are associated with an audiovisual stream form the integrated internal camera inside the automobile focused on the driver, an audiovisual stream from the passenger participant device located near the back seat of the automobile, an audiovisual stream from an external camera on the automobile showing the view of the driver, a graphic map showing the current location of the automobile, and an object displaying continuously updated data from the external and internal sensors of the automobile.

In the illustrated example, the remote participant may interact with the other participants in a number of different ways. For example, the remote participant may make a swiping motion with their finger to draw a circle around a point of interest. The experience platform may then display the circle over the map on the integrated display in the automobile in FIG. 5. The remote participant may also look up information on a nearby restaurant on the remote participant device and send that information to be displayed on the integrated display at the automobile. Alternatively, the remote participant may send a video clip to the passenger participant device located in the back seat of the automobile.

According to FIG. 7, a passenger participant may be seated in the back seat of the automobile and have a passenger participant device capable of presenting content from this and/or other interactive experiences. For the purpose of illuminating the present example, the passenger participant in this example might be the child of the driver and the remote participant. Here the passenger participant has joined both the private interactive experience at the automobile and a public interactive experience at a sporting event. The experience platform may present objects associated with both the private interactive experience at the automobile or the public interactive experience at the sporting event. Here, an object of the private interactive experience at the automobile is associated with the audiovisual stream from the remote participant device. The objects of the public interactive experience at the sporting event are associated with an audiovisual stream from the remote physical venue of the sporting event and audiovisual streams from remote participants of the public interactive experience at the sporting event. For the purpose of illuminating the present example, the remote participants of the interactive experience at the sporting event may be friends of the local participant.

As discussed earlier, a system according to one embodiment of the present disclosure may be configured to limit the display of content on a particular participant device based on the relative location of the participant device in the physical venue. In the present example, according to FIG. 7, the system may be configured so that the local participant device is incapable of receiving the audiovisual stream from the sporting event when the local participant device is located near the driver's seat of the automobile and the automobile is in motion. Such a configuration would allow the local participant to avoid distraction while driving the automobile. Configuration of this feature may be adjusted according to the characteristics of the physical venue. For example, an interactive experience system in accordance with one embodiment of the present disclosure may recognize that the automobile is equipped with systems allowing the automobile to automatically drive with minimal input from a driver. The interactive experience system can then adjust the configuration thereby allowing a participant device to display the audiovisual stream from the sporting event while the participant device is near the driver's seat and the automobile is in motion.

Figure 9:
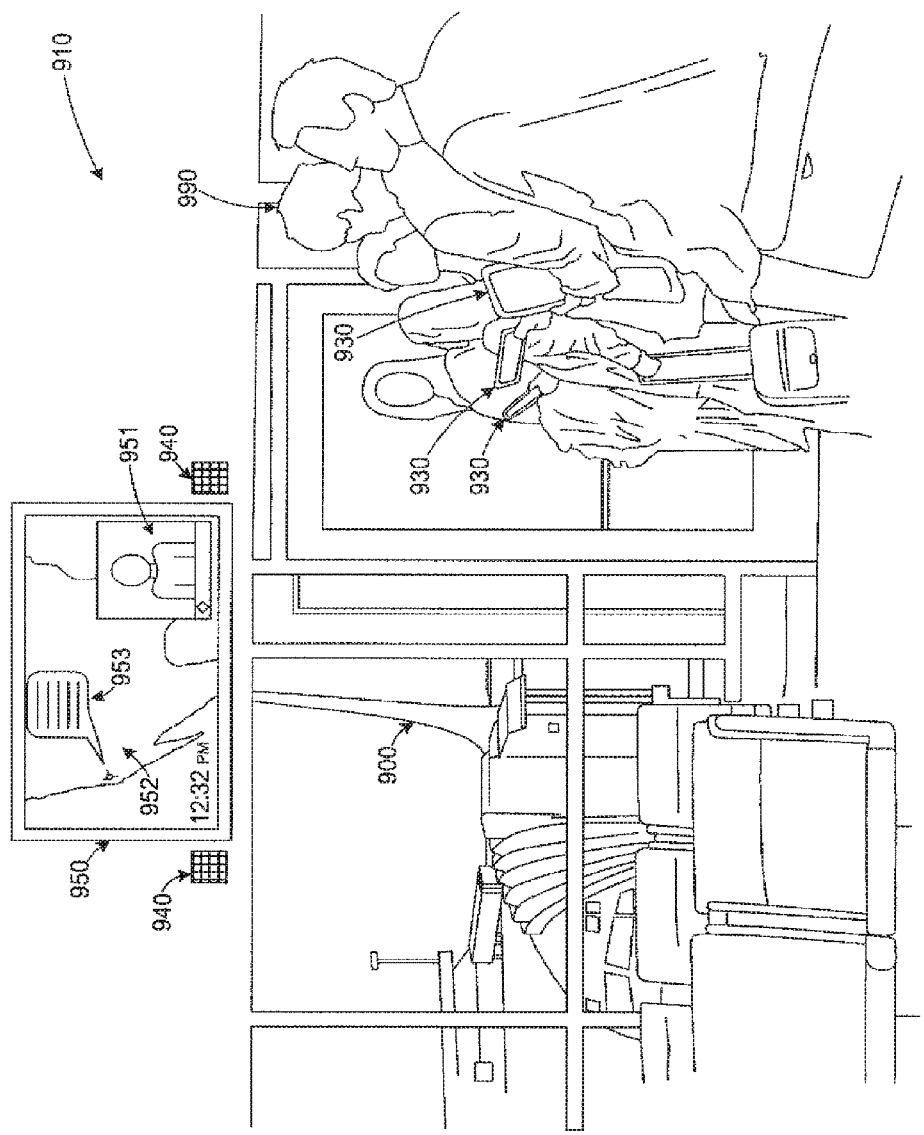
FIG. 9 illustrates devices in an airport waiting area implementing an interactive experience system in accordance with yet another embodiment of the present disclosure.
Figure 10:
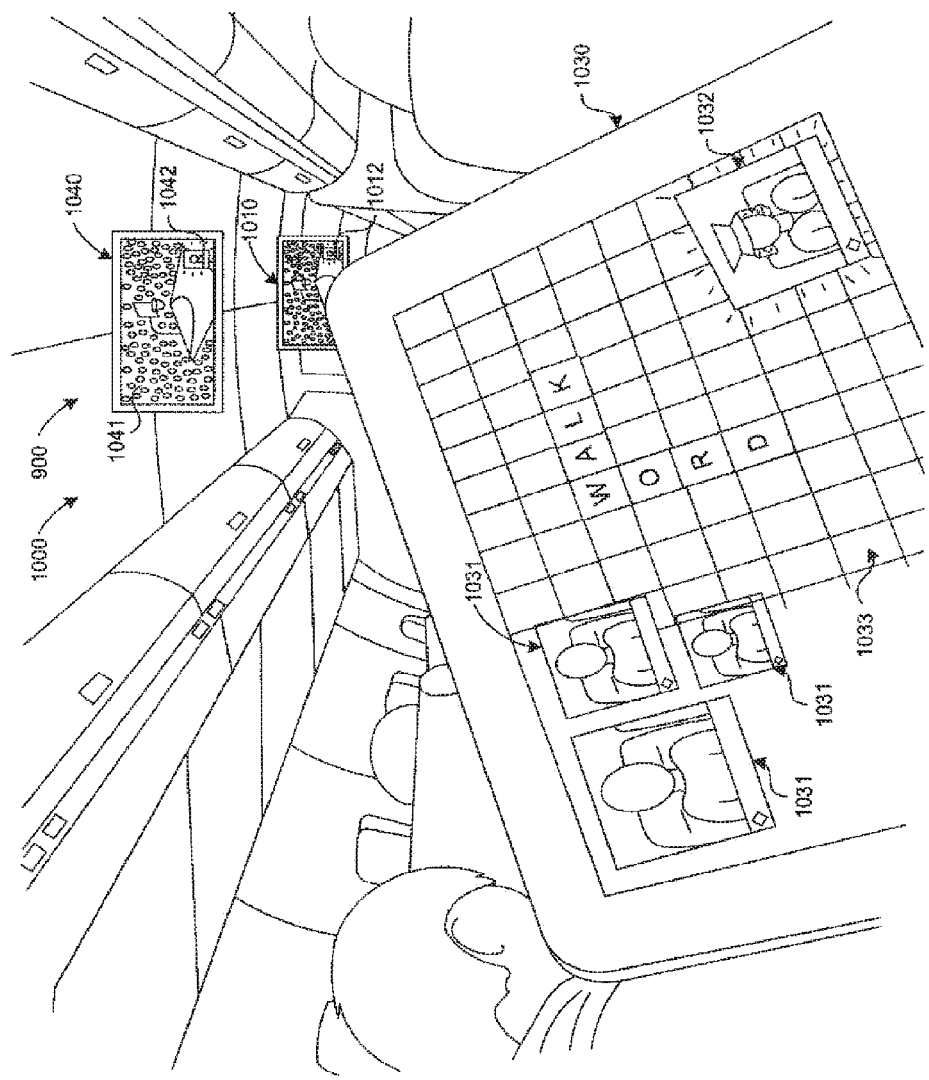
FIG. 10 illustrates devices on an aircraft implementing an interactive experience system in accordance with yet another embodiment of the present disclosure.
Figure 11:
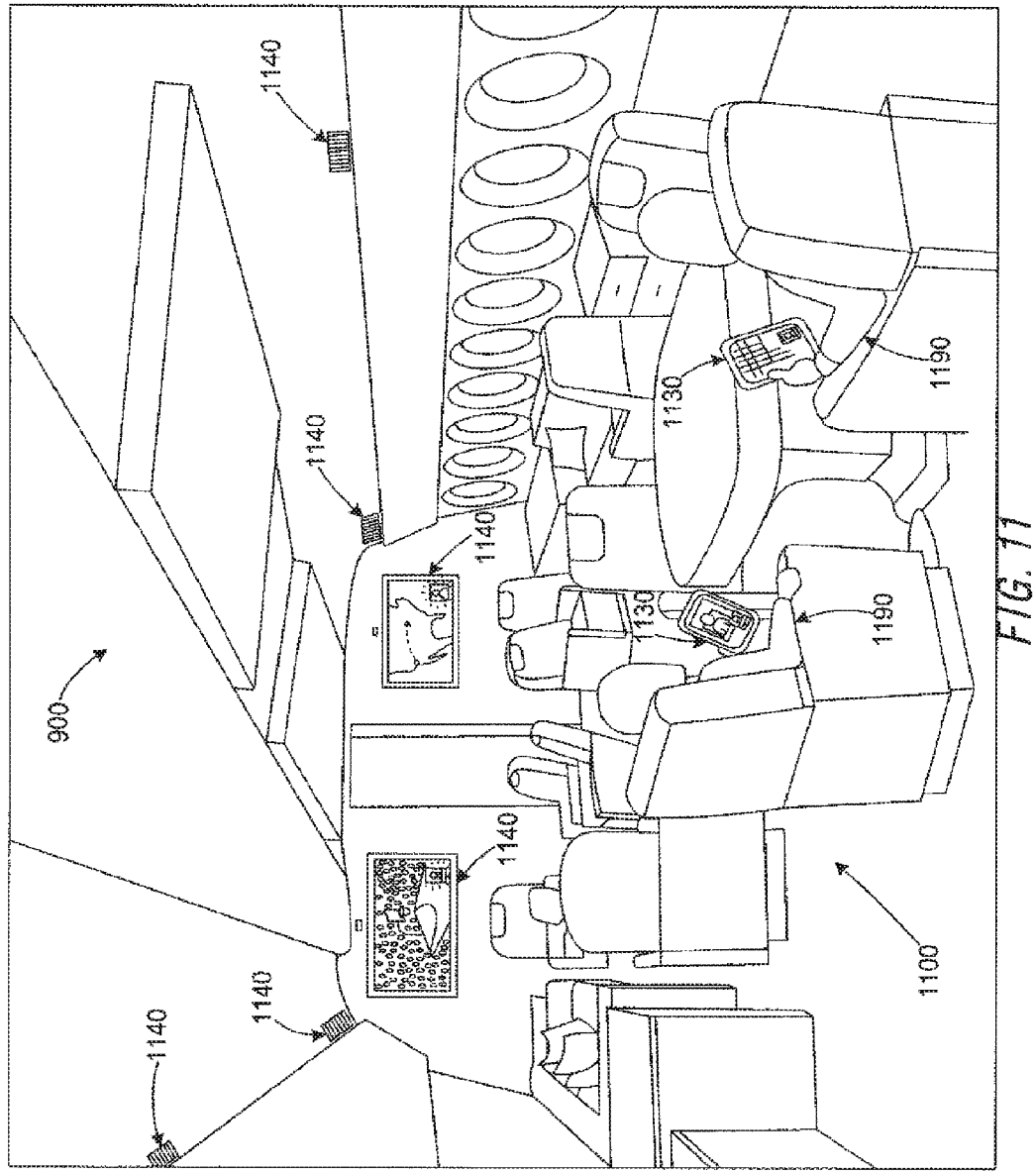
FIG. 11 illustrates devices on an aircraft implementing an interactive experience system in accordance with yet another embodiment of the present disclosure.

FIGS. 9-11 illustrate, by way of example, an implementation of the methods and systems in accordance with one embodiment of the present disclosure. In this example, a participant has initiated a private interactive experience at an aircraft. FIG. 9 illustrates passenger waiting at an airport to board an aircraft and utilizing an interactive experience system such as the interactive experience system illustrated in FIG. 1. FIG. 10 illustrates a passenger seated in a coach seating section on board an aircraft utilizing an interactive experience system such as the interactive experience system illustrated in FIG. 1. FIG. 11 illustrates passengers seated in a first class lounge on board an aircraft utilizing an interactive experience system such as the interactive experience system illustrated in FIG. 1.

According to FIG. 9, an airport waiting area may include integrated venue devices, in this example, an integrated display and integrated speakers. Additionally passengers may carry passenger participant devices, in this example, mobile tablet devices. Once a particular participant has initiated the private interactive experience at the aircraft, passengers may join the interactive experience at which point they become passenger participants in the interactive experience. In this example, the interactive experience is private so passengers must wait to be invited before joining the interactive experience. Alternatively, the system may be configured so that passengers automatically join and become participants once the come into close proximity with a physical venue, in this case the aircraft.

According to FIG. 9, an experience platform may present content associated with the interactive experience on one or more objects on one or more content layers. In the illustrated example, objects associated with visual streams may be displayed on the integrated display device. Similarly, objects associated with audio streams may be presented via the integrated speakers. Here, the objects of the interactive experience presented on the integrated display and integrated speakers are associated with an audiovisual stream from a flight crew participant, a visual stream of a graphic of a map showing the current location of the aircraft, and a visual stream of a graphic showing updated data from internal and/or external sensors on the aircraft. The objects of the interactive experience presented on the participant devices may be the same as those displayed on the integrated display or they may include objects with particularized information such as ticketing information of seating assignment. Additionally, the interactive experience system may be configured to allow passenger participants to utilize the integrated display and integrated speakers to make announcements. For example, a passenger participant may, with a gesture on a touch-screen passenger participant device, send an object associated with an audiovisual stream from the passenger participant device to the integrated display. The passenger participant may then make an announcement to other participants in the waiting area to ask to switch seats so that they can sit with a family member.

According to FIG. 10, the coach seating section on the aircraft may include a plurality of integrated displays and integrated speakers. Additionally, the passenger participant may have a passenger participant device. An experience platform displays content associated with the interactive experience on one or more objects one or more content layers. In the illustrated example, objects associated with visual streams may be displayed on the integrated display device. Similarly, objects associated with audio streams may be presented via the integrated speakers. Here, the objects of the interactive experience presented on the integrated display devices and integrated speakers are associated with a live audiovisual stream from a remote physical venue hosting a sporting event and a live audiovisual stream from a pilot participant. The objects of the interactive experience presented on the passenger participant device are associated with live audiovisual streams from other passenger participants, a live audiovisual stream from the pilot participant, and a visual stream of graphics associated with an interactive game of Scrabble.

In the above example, a live audiovisual stream from a remote physical venue hosting a sporting event is presented on the integrated displays and integrated speakers. The selection of content presented on the integrated displays and speakers may be set by a particular participant, for example a flight crew member. The content presented on the integrated displays and integrated speakers may also be selected by a direct vote from all of the passenger participants via passenger participant devices. Additionally, the content presented on integrated displays and integrated speakers may be selected automatically by the experience platform based on the level of emotional engagement of the passenger participants. In such an embodiment, the level of emotional engagement of the passenger participants may be determined using a plurality of sensors integrated into the physical venue and/or integrated into individual participant devices.

In the above example, live audiovisual streams from other passenger participants are presented on a passenger participant device. For the purpose of illuminating the present example, the other passenger participants may be members of a family that are seated separately, but wish to speak with one another. The objects associated with the audiovisual streams from the other passenger participants may be sized according to various criteria. For example, the passenger participant may control the size of each object, by using hand gestures on a touch screen. Additionally, the experience platform may automatically size an object when the passenger participant associate with the object is speaking. Additionally, the experience platform may automatically size objects based on a relative distance between passenger participants associated with the objects on the aircraft.

In addition to communicating via audiovisual streams, the passenger participants in the above example may interact with each other by playing an interactive game. Here, the passenger participant and three other passenger participants on the aircraft are playing an interactive game of scrabble. Additionally, the passenger participant may invite another participant to join the game of Scrabble. The other participant in the game of Scrabble may be physically located on the same flight, on a different flight, or at another remote physical venue, for example a house.

It should be noted that in the above example, the experience engine is presenting an object associated with an AV stream from the pilot participant on the passenger participant device as well as all of the integrated displays. Here, the pilot participant is overriding all devices associated with the interactive experience (both participant devices and integrated venue devices) to convey an important message to other participants about the flight.

FIG. 11 illustrates several passenger participants seated in a first class lounge in the aircraft. According to FIG. 11, the coach seating section on the aircraft may have a one or more integrated displays and one or more integrated speakers. Additionally, the passenger participants may have passenger participant devices. Similar to the coach seating section, the experience platform displays content associated with the interactive experience on one or more objects on one or more content layers. In the illustrated example, objects associated with visual streams may be displayed on the integrated display devices inside the first class lounge or displayed on participant devices in the first class lounge. Similarly, objects associated with audio streams may be presented via integrated speakers in the first class lounge or presented via participant devices in the first class lounge. As discussed earlier, additional content and/or services may be available to participant devices located in the first class lounge that are not available to participant devices located in the coach seating. For example, the experience platform may grant priority to participant devices in the first class lounge for direct live audiovisual streams to remote participants (e.g. family members and friends on the ground) where granting such services to all participant devices in the coach seating area would overwhelm available bandwidth on a satellite connection from the aircraft to the internet.

It will understood that while the above illustrated examples describe an interactive experience system that manages audiovisual streams the present disclosure is not limited to just audiovisual streams. According to another embodiment, the experience platform may also couple and synchronize streams of data associated with touch, smell or other sensory data that may be used to provide an interactive experience. For example, a particular passenger device may transmit a stream of tactile data. In this example, the particular participant passenger participant may touch a particular passenger particular device and the experience platform may present the tactile data on another passenger participant device in the form of a tactile sensation transmitted to a hand of the other passenger participant, thereby allowing a particular passenger participant to touch another passenger participant seated in another section of the aircraft.

Figure 12:
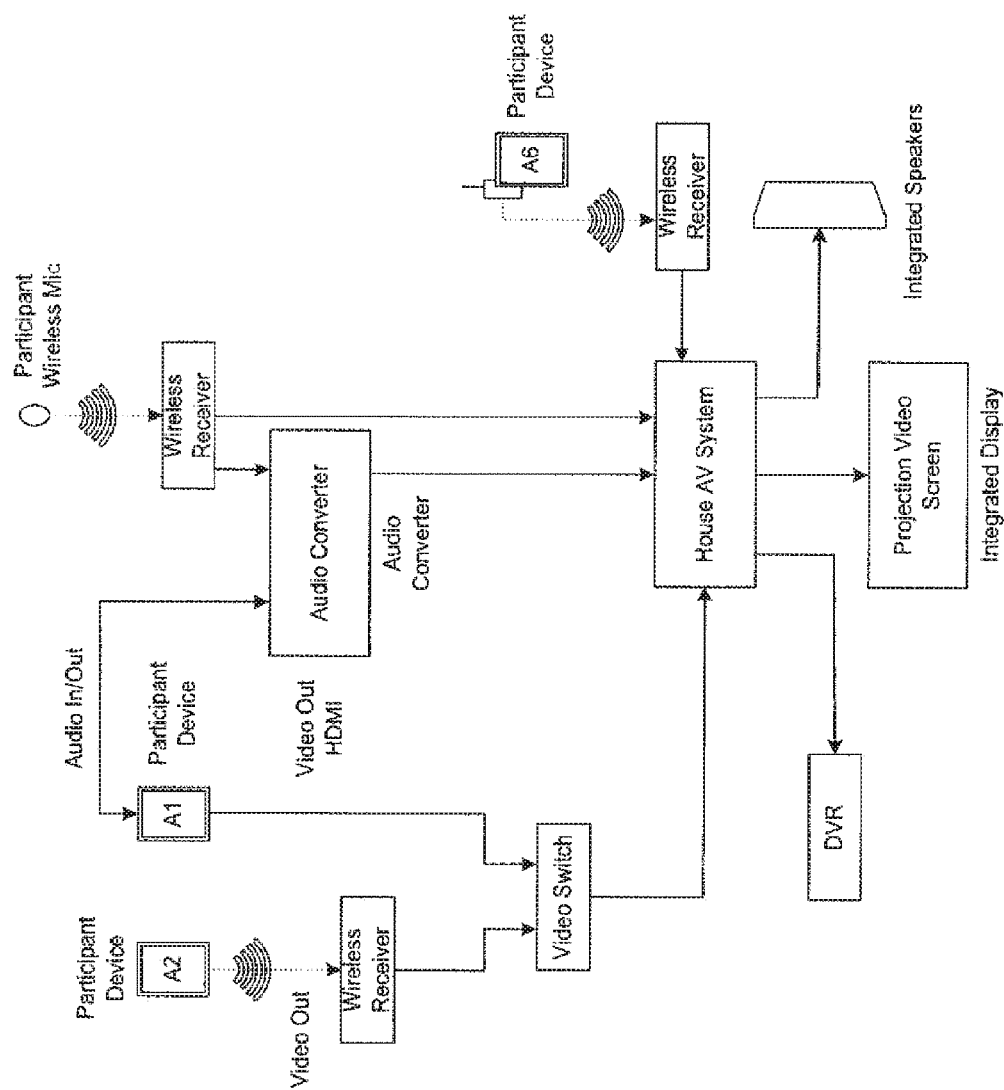
FIG. 12 illustrates architecture of video audio host system at a host venue of an interactive experience in accordance with yet another embodiments of the present disclosure.

FIG. 12 illustrates architecture of video and audio system at a host venue 700 of an interactive experience in accordance with yet another embodiment of the present disclosure. It will be appreciated that the host venue in this context may be either a vehicle or a stationary physical venue. In some embodiments, video signals captured at the host venue 700 (e.g., video signals from participant devices) may be transmitted to a house AV system 710 through wired and/or wireless connections. Audio signals captured at the host venue 700 (e.g., audio signals from participant devices) may also be transmitted to the host AV system 710 through wired or wireless connections and combined into one set of audio signals. The house AV system 710 can couple and synchronize received video and audio signals at the host venue 700. The house AV system 710 may transmit synchronized video and audio signals to an experience platform via internet, a projection video screen, and/or house speakers at the host venue 700. In some implementations, synchronized video signals may also be transmitted to a DVR for recording.

In some embodiments, video and audio signals captured at the host venue 700 can be directly transmitted to an experience platform 160 via internet or may be transmitted to experience platform via direct wireless and/or wired transmission between devices (e.g. via Bluetooth). The experience platform 160 can couple and synchronize video and audio signals from a plurality of physical venues of the interactive experience and then transmit synchronize video and audio signals to devices at all physical venues.

As will be appreciated by one of ordinary skill in the art, the operations or methods may be instantiated locally (i.e., on one local computer system) and may be distributed across remote computer systems. For example, it may be determined that the available computing power of the local computer system is insufficient or that additional computing power is needed, and may offload certain aspects of the operations to the cloud.

While the computer-readable medium is shown in an embodiment to be a single medium, the term "computer-readable medium" should be taken to include single medium or multiple media (e.g., a centralized or distributed database, and/or associated caches and servers) that stores the one or more sets of instructions. The term "computer-readable medium" shall also be taken to include any medium that is capable of storing, encoding or carrying a set of instructions for execution by the computer and that cause the computer to perform any one or more of the methodologies of the presently disclosed technique and innovation.

Further examples of computer-readable medium, machine-readable storage medium, machine-readable medium or computer-readable (storage) medium include but are not limited to recordable type medium such as volatile and non-volatile memory devices, floppy and other removable disks, hard disk drives, optical disks, Digital Versatile Disks, among others and transmission type medium such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing are intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The computer may be, but is not limited to, a server computer, a client computer, a personal computer (PC), a tablet PC, a laptop computer, a set-top box (STB), a personal digital assistant (PDA), a cellular telephone, an iPhone®, an iPad®, a processor, a telephone, a web appliance, a network router, switch or bridge, or any machine capable of executing a set of instructions (sequential or otherwise) that specify actions to be taken by that machine.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In general, the routines executed to implement the embodiments of the disclosure may be implemented as part of an operating system or a specific application, component, program, object, module or sequence of instructions referred to as "programs." The programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, various embodiments are capable of being distributed as a program product in a variety of forms, and that the disclosure applies equally regardless of the particular type of computer-readable medium used to actually effect the distribution.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical or a combination thereof. Additionally, the words "herein," "above," "below" and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all the following interpretations of the word, any of the items in the list, all of the items in the list and any combination of the items in the list.

The above detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks in a different order, and some processes or blocks may be deleted, moved, added, subdivided, combined and/or modified to provide alternative or sub combinations. Each of these processes or blocks may be implemented in a variety of different ways. Also, while processes or blocks are at times shown as being performed in series, these processes or blocks may instead be performed in parallel or may be performed at different times. Further, any specific numbers noted herein are only examples—alternative implementations may employ differing values or ranges.

The teaching of the disclosure provided herein can be applied to other systems and not necessarily to the system described above. Any patents and applications and other references noted above, including any that may be listed in accompanying filing papers, are incorporated herein by reference. Aspects of the disclosure can be modified if necessary to employ the systems, functions and concepts of the various references described above to provide yet further embodiments of the disclosure.

Any patents and applications and other references noted above, including any that may be listed in accompanying filing papers, are incorporated herein by reference. Aspects of the disclosure can be modified if necessary to employ the systems, functions, and concepts of the various references described above to provide yet further embodiments of the disclosure.

These and other changes can be made to the disclosure in light of the above Detailed Description. While the above description describes certain embodiments of the disclosure and describes the best mode contemplated, no matter how detailed the above appears in text, the teachings can be practiced in many ways. Details of the system may vary considerably in its implementation details while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for".) Accordingly, the applicant reserves the right to add additional claims after filing the application to pursue such additional claim forms for other aspects of the disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally or logically, are understood to be implemented by computer programs or equivalent electrical circuits, microcode or the like. Furthermore, it has also proven convenient at times to refer to these arrangements of operations as modules, without loss of generality. The described operations and their associated modules may be embodied in software, firmware, hardware or any combinations thereof.

Any of the steps, operations or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a nontransitory, tangible computer-readable storage medium, or any type of medium suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a nontransitory, tangible computer-readable storage medium and may include any embodiment of a computer program product or other data combination described herein.

What is claimed is:

1. A method of operating a network-capable experience platform system comprising:
   facilitating an interactive gathering among a plurality of participants by:
      receiving live video streams from a plurality of participant devices and from an integrated video capture device of a vehicle, the plurality of participant devices including devices located within the vehicle and remotely located from the vehicle;
      synchronizing the received live video streams;
      providing layers for composing a live experience presentation at one or more of the plurality of participant devices, the layers including a base layer and a content layer; and
      generating a plurality of interactive objects, wherein one or more of the plurality of interactive objects are associated with one or more of the plurality of synchronized live video streams; and
   for each of the plurality of participant devices:
      identifying a relationship between the participant device and the vehicle, wherein identifying the relationship includes:
         detecting a location of the participant device relative to the vehicle, wherein detecting the location of the participant device relative to the vehicle includes detecting a device location of the participant device and detecting a vehicle location of the vehicle; and
         assigning a participant type based on the detected location, the participant type including the categories of an operator of the vehicle, a passenger of the vehicle, and a remote participant, the remote participant located outside of the vehicle;
      configuring the live experience presentation based on the assigned participant type, wherein configuring the live experience presentation includes composing one or more of the plurality of the interactive objects in the content layer based on the assigned participant type; and
      causing display, at the participant device, of the live experience presentation including the base layer and the content layer.

2. The method of claim 1, wherein configuring the live experience presentation includes arranging the layers, suppressing at least one of the layers or elements within the layers, or configuring a privacy setting of who may join the interactive gathering.

3. The method of claim 1, further comprising joining the participant device to the interactive gathering by identifying a participant through the participant device and synchronizing the live experience presentation with an external live experience presentation of another participant of the interactive gathering.

4. The method of claim 1, wherein includes identifying whether the participant device is within the vehicle.

5. The method of claim 1, wherein detecting a location of the participant device relative to the vehicle includes identifying whether the participant device is within a predefined close proximity of the vehicle.

6. The method of claim 1, wherein detecting a location of the participant device relative to the vehicle includes identifying a seat location of the participant device within the vehicle.

7. The method of claim 1, the assigned participant type is associated with restrictions of receiving or sending the layers through the interactive gathering.

8. The method of claim 1, wherein facilitating the interactive gathering further includes providing an output layer to an output device integrated within the vehicle, the output layer different from the layers provided for the participant device.

9. The method of claim 1, further comprising equalizing and synchronizing the live experience presentation on the participant device with another live experience presentation on a device within the vehicle.

10. A method of operating a network-capable participant device comprising:
    receiving a content layer at the participant device, the content layer including a plurality of synchronized live video streams from a plurality of participant devices and from an integrated video capture device of a vehicle, the plurality of participant devices including devices physically located within the vehicle and devices remotely located from the vehicle;
    generating a live experience presentation for an interactive gathering on the participant device, the live experience presentation composed of layers including a base layer and the content layer;
    identifying a relationship between the participant device and the vehicle, wherein identifying the relationship includes:
       detecting a location of the participant device relative to the vehicle, wherein detecting the location of the participant device relative to the vehicle includes detecting a device location of the participant device and detecting a vehicle location of the vehicle; and
       assigning a participant type based on the detected location, the participant type including the categories of an operator of the vehicle, a passenger of the vehicle, and a remote participant, the remote participant located outside of the vehicle;
    generating a plurality of interactive objects, some of the plurality of interactive objects associated with the plurality of received synchronized video streams;
    configuring the live experience presentation based on the assigned participant type, wherein configuring the live experience presentation includes composing the plurality of interactive objects in the content layer based on the assigned participant type; and
    displaying the live experience presentation including the base layer and the content layer.

11. The method of claim 10, wherein the interactive gathering is private and only a subset of current participants of the interactive gathering may invite an additional participant to join.

12. The method of claim 10, further comprising determining whether the vehicle is in motion beyond a pre-defined threshold, wherein configuring the live experience presentation includes providing an engagement blind disabling at least part of the live experience presentation when the vehicle is in motion beyond the pre-defined threshold.

13. The method of claim 10, wherein configuring the live experience presentation includes providing an engagement blind disabling at least part of the live experience presentation if the assigned participant type is a controller of the vehicle.

14. The method of claim 10, wherein generating the plurality of interactive-objects includes providing an override option on the participant device to override other live experience presentations on participant devices of passengers of the vehicle.

15. The method of claim 10, wherein at least one of the plurality of interactive objects includes-an adjustment control object configured to receive an input to activate an environment manipulation device within the vehicle based if the assigned participant type is an operator or a passenger of the vehicle.

16. The method of claim 10, wherein at least one of the plurality of interactive objects includes a premium content object unavailable to another participant device within the vehicle.

17. The method of claim 10, wherein at least one of the plurality of interactive objects includes a throwable object, that may be transferred from a display of the participant device to a display of another participant device in the interactive gathering based on a gesture received via the participant device.

18. The method of claim 10, wherein at least one of the plurality of interactive objects includes a graphical map including a current location or route of the vehicle.

19. The method of claim 10, wherein at least one of the plurality of interactive objects includes a live video stream from the integrated video capture device of the vehicle if the participant type is a remote participant.

20. The method of claim 10, further comprising joining the participant device in the interactive gathering when the participant device is determined to be within a pre-defined proximity of the vehicle.

21. The method of claim 10, wherein at least one of the plurality of interactive objects includes a seating arrangement object on the participant device.

22. The method of claim 21, wherein the seating arrangement object is configured to receive an input requesting a change in a seating arrangement in the if the assigned participant type is a passenger of the vehicle.

23. An experience platform system comprising:
one or more modules stored on one or more non-transitory storage mediums that, when executed by a processor, are configured to:
facilitate an interactive gathering among a plurality of participants by:
receiving live video streams from a plurality of participant devices and from an integrated video capture device of a vehicle, the plurality of participant devices including devices physically located within the vehicle and devices remotely located from the vehicle;
synchronizing the received live video streams;
providing layers for composing a live experience presentation at one or more of the plurality of participant devices, the layers including a content layer; and
generating a plurality of interactive objects for display on the content layer of the live experience presentation, each of the plurality of interactive objects associated with one or more of the received live video streams; and
for each of the plurality of participant devices:
identify a relationship between the participant device and the vehicle, wherein identifying the relationship includes:
detecting a location of the participant device relative to the vehicle, wherein detecting the location of the participant device relative to the vehicle includes detecting a device location of the participant device and detecting a vehicle location of the vehicle; and
assigning a participant type based on the detected location, the participant type including the categories of an operator of the vehicle, a passenger of the vehicle, and a remote participant, the remote participant located outside of the vehicle;
configure the live experience presentation based on assigned participant type, wherein configuring the live experience presentation includes composing one or more of the plurality of the interactive objects based on the assigned participant type; and
cause display, at the participant device, of the content layer including the composed one or more interactive objects.

24. The experience platform system of claim 23, wherein the one or more modules are further configured to couple over a network to communicate with an embedded device within the vehicle.

25. A participant device configured to interact with another participant device through an experience platform comprising:
a network device configured to receive a content layer, the content layer including a plurality of synchronized live video streams from a plurality of participant devices and from an integrated video capture device of a vehicle, the plurality of participant devices including devices physically located within the vehicle and devices remotely located from the vehicle;
a sensor configured to provide a location information;
a module stored on a non-transitory storage medium, when executed by a processor is configured to:
generate a live experience presentation for an interactive gathering on the participant device, the live experience presentation composed of layers including a base layer and the content layer;
identify a relationship between the participant device and the vehicle, wherein identifying the relationship includes:
detecting a location of the participant device relative to the vehicle based on data received via the sensor, wherein detecting the location of the participant device relative to the vehicle includes detecting a device location of the participant device and detecting a vehicle location of the vehicle; and
assigning a participant type based on the detected location, the participant type including the categories of an operator of the vehicle, a passenger of the vehicle, or a remote participant, the remote participant located outside of the vehicle;
configure the live experience presentation based on the assigned participant type, wherein configuring the live experience presentation includes:
generate and compose a plurality of interactive objects within the content layer based on the assigned participant type, wherein one or more of the plurality of interactive objects is associated with one or more of the received synchronized live video streams; and
display the live experience presentation including the base layer and the content layer.

26. The participant device of claim 25, wherein the network device is further configured to communicate directly an in-vehicle device integrated with the vehicle.

27. The participant device of claim 25, wherein the participant device is integrated within the vehicle.

\* \* \* \* \*